(12) United States Patent
Bassett et al.

(10) Patent No.: US 9,615,497 B2
(45) Date of Patent: Apr. 11, 2017

(54) MODULAR AUTONOMOUS FARM VEHICLE

(71) Applicant: Dawn Equipment Company, Sycamore, IL (US)

(72) Inventors: Joseph D. Bassett, Sycamore, IL (US); Rodney J. Arthur, DeKalb, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 14/628,577

(22) Filed: Feb. 23, 2015

(65) Prior Publication Data

US 2015/0237791 A1    Aug. 27, 2015

Related U.S. Application Data

(60) Provisional application No. 61/942,779, filed on Feb. 21, 2014.

(51) Int. Cl.
*A01B 51/02*   (2006.01)
*A01B 69/00*   (2006.01)

(52) U.S. Cl.
CPC ............ *A01B 51/02* (2013.01); *A01B 69/004* (2013.01)

(58) Field of Classification Search
CPC ....... A01C 7/021; A01B 51/02; A01B 51/023; A01B 69/00; A01B 69/004
USPC ........... 56/13.5, 16.7; 111/20, 18, 15, 54, 69
See application file for complete search history.

(56) References Cited

U.S. PATENT DOCUMENTS

| | | |
|---|---|---|
| 114,002 A | 4/1871 | Godfrey |
| 321,906 A | 7/1885 | McCormick |
| 353,491 A | 2/1886 | Wells |
| 523,508 A | 7/1894 | Bauer |
| 736,369 A | 8/1903 | Dynes |
| 803,088 A | 10/1905 | Barker |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |

(Continued)

FOREIGN PATENT DOCUMENTS

| | | |
|---|---|---|
| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — John G Weiss

(74) *Attorney, Agent, or Firm* — Nixon Peabody LLP

(57) ABSTRACT

A modular autonomous agricultural vehicle includes a drive module having a frame, a ground-engaging element rotatably coupled to the frame, a power source, and a drive motor receiving power from the power source and coupled to the ground-engaging element for rotating the ground engaging element. At least one toolbar module is detachably coupled to the frame for coupling the drive module to an agricultural implement or another modular toolbar segment. The modular toolbar preferably includes multiple toolbar modules coupled to each other in series to form the modular toolbar.

12 Claims, 16 Drawing Sheets

(56) References Cited

U.S. PATENT DOCUMENTS

| | | |
|---|---|---|
| 1,398,668 A | 11/1921 | Bordsen |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A * | 12/1933 | Broemmelsick ......... A01C 7/08 172/310 |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,256,942 A * | 6/1966 | Van Sickle ............ A01B 35/04 172/310 |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,420,273 A | 1/1969 | Greer |
| 3,447,495 A | 6/1969 | Miller |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,975,890 A | 8/1976 | Rodger |
| 3,986,464 A * | 10/1976 | Uppiano ............... A01C 9/00 111/59 |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | van der Lely |
| 4,063,597 A | 12/1977 | Day |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,703,809 A | 11/1987 | Van den Ende |
| 4,726,304 A | 2/1988 | Dreyer |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |

(56) References Cited

U.S. PATENT DOCUMENTS

| | | | |
|---|---|---|---|
| 4,768,387 A | 9/1988 | Kemp | |
| 4,779,684 A | 10/1988 | Schultz | |
| 4,785,890 A | 11/1988 | Martin | |
| 4,825,957 A | 5/1989 | White | |
| 4,825,959 A | 5/1989 | Wilhelm | |
| 4,920,901 A | 5/1990 | Pounds | |
| 4,926,767 A | 5/1990 | Thomas | |
| 4,930,431 A | 6/1990 | Alexander | |
| 4,986,367 A | 1/1991 | Kinzenbaw | |
| 4,998,488 A | 3/1991 | Hansson | |
| 5,015,997 A | 5/1991 | Strubbe | |
| 5,027,525 A | 7/1991 | Haukaas | |
| 5,033,397 A | 7/1991 | Colburn, Jr. | |
| 5,065,632 A | 11/1991 | Reuter | |
| 5,074,227 A | 12/1991 | Schwitters | |
| 5,076,180 A | 12/1991 | Schneider | |
| 5,092,255 A | 3/1992 | Long | |
| 5,113,957 A | 5/1992 | Tamai | |
| 5,129,282 A | 7/1992 | Bassett | |
| 5,136,934 A | 8/1992 | Darby, Jr. | |
| 5,190,112 A | 3/1993 | Johnston | |
| 5,224,553 A | 7/1993 | Heintzman | |
| 5,234,060 A | 8/1993 | Carter | |
| 5,240,080 A | 8/1993 | Bassett | |
| 5,255,617 A | 10/1993 | Williams | |
| 5,269,237 A | 12/1993 | Baker | |
| 5,282,389 A | 2/1994 | Faivre | |
| 5,285,854 A | 2/1994 | Thacker | |
| 5,333,694 A | 8/1994 | Roggenbuck | |
| 5,337,832 A | 8/1994 | Bassett | |
| 5,341,754 A | 8/1994 | Winterton | |
| 5,346,019 A | 9/1994 | Kinzenbaw | |
| 5,346,020 A | 9/1994 | Bassett | |
| 5,349,911 A | 9/1994 | Holst | |
| 5,351,635 A | 10/1994 | Hulicsko | |
| 5,379,847 A | 1/1995 | Snyder | |
| 5,394,946 A | 3/1995 | Clifton | |
| 5,398,771 A | 3/1995 | Hornung | |
| 5,419,402 A | 5/1995 | Heintzman | |
| 5,427,192 A | 6/1995 | Stephenson | |
| 5,443,023 A | 8/1995 | Carroll | |
| 5,443,125 A | 8/1995 | Clark | |
| 5,461,995 A | 10/1995 | Winterton | |
| 5,462,124 A | 10/1995 | Rawson | |
| 5,473,999 A | 12/1995 | Rawson | |
| 5,474,135 A | 12/1995 | Schlagel | |
| 5,477,682 A | 12/1995 | Tobiasz | |
| 5,477,792 A | 12/1995 | Bassett | |
| 5,479,868 A | 1/1996 | Bassett | |
| 5,479,992 A | 1/1996 | Bassett | |
| 5,485,796 A | 1/1996 | Bassett | |
| 5,485,886 A | 1/1996 | Bassett | |
| 5,497,717 A | 3/1996 | Martin | |
| 5,497,837 A | 3/1996 | Kehrney | |
| 5,499,683 A | 3/1996 | Bassett | |
| 5,499,685 A | 3/1996 | Downing, Jr. | |
| 5,517,932 A | 5/1996 | Ott | |
| 5,524,525 A | 6/1996 | Nikkel | |
| 5,531,171 A | 7/1996 | Whitesel | |
| 5,542,362 A | 8/1996 | Bassett | |
| 5,544,709 A | 8/1996 | Lowe | |
| 5,562,165 A | 10/1996 | Janelle | |
| 5,590,611 A | 1/1997 | Smith | |
| 5,603,269 A | 2/1997 | Bassett | |
| 5,623,997 A | 4/1997 | Rawson | |
| 5,640,914 A | 6/1997 | Rawson | |
| 5,657,707 A | 8/1997 | Dresher | |
| 5,660,126 A | 8/1997 | Freed | |
| 5,685,245 A | 11/1997 | Bassett | |
| 5,704,430 A | 1/1998 | Smith | |
| 5,709,271 A | 1/1998 | Bassett | |
| 5,725,057 A | 3/1998 | Taylor | |
| 5,727,638 A | 3/1998 | Wodrich | |
| 5,809,757 A * | 9/1998 | McLean | A01D 34/665 56/13.6 |
| 5,852,982 A | 12/1998 | Peter | |
| 5,868,207 A | 2/1999 | Langbakk | |
| 5,878,678 A | 3/1999 | Stephens | |
| RE36,243 E | 7/1999 | Rawson | |
| 5,953,895 A | 9/1999 | Hobs | |
| 5,970,891 A | 10/1999 | Schlagel | |
| 5,970,892 A | 10/1999 | Wendling | |
| 5,988,293 A | 11/1999 | Brueggen | |
| 6,067,918 A | 5/2000 | Kirby | |
| 6,068,061 A | 5/2000 | Smith | |
| 6,091,997 A | 7/2000 | Flamme | |
| 6,164,385 A | 12/2000 | Buchl | |
| 6,176,334 B1 * | 1/2001 | Lorenzen | B62D 21/14 180/9.46 |
| 6,223,663 B1 | 5/2001 | Wendling | |
| 6,223,828 B1 | 5/2001 | Paulson | |
| 6,237,696 B1 | 5/2001 | Mayerle | |
| 6,253,692 B1 | 7/2001 | Wendling et al. | |
| 6,314,897 B1 | 11/2001 | Hagny | |
| 6,325,156 B1 | 12/2001 | Barry | |
| 6,330,922 B1 | 12/2001 | King | |
| 6,331,142 B1 | 12/2001 | Bischoff | |
| 6,343,661 B1 | 2/2002 | Thompson | |
| 6,347,594 B1 | 2/2002 | Wendling | |
| 6,382,326 B1 | 5/2002 | Goins | |
| 6,389,999 B1 | 5/2002 | Duello | |
| 6,453,832 B1 | 9/2002 | Schaffert | |
| 6,454,019 B1 | 9/2002 | Prairie | |
| 6,460,623 B1 | 10/2002 | Knussman | |
| 6,516,595 B2 | 2/2003 | Rhody | |
| 6,530,334 B2 | 3/2003 | Hagny | |
| 6,575,104 B2 | 6/2003 | Brummelhuis | |
| 6,644,224 B1 | 11/2003 | Bassett | |
| 6,681,868 B2 | 1/2004 | Kovach | |
| 6,701,856 B1 | 3/2004 | Zoke | |
| 6,701,857 B1 | 3/2004 | Jensen | |
| 6,715,433 B1 | 4/2004 | Friestad | |
| 6,786,130 B2 | 9/2004 | Steinlage | |
| 6,834,598 B2 | 12/2004 | Jüptner | |
| 6,840,853 B2 | 1/2005 | Foth | |
| 6,886,650 B2 | 5/2005 | Bremmer | |
| 6,912,963 B2 | 7/2005 | Bassett | |
| 6,968,907 B1 | 11/2005 | Raper | |
| 6,986,313 B2 | 1/2006 | Halford | |
| 6,997,400 B1 | 2/2006 | Hanna | |
| 7,004,090 B2 | 2/2006 | Swanson | |
| 7,044,070 B2 | 5/2006 | Kaster | |
| 7,063,167 B1 | 6/2006 | Staszak | |
| 7,159,523 B2 | 1/2007 | Bourgault | |
| 7,163,227 B1 * | 1/2007 | Burns | B60B 35/1054 180/906 |
| 7,222,575 B2 | 5/2007 | Bassett | |
| 7,290,491 B2 | 11/2007 | Summach | |
| 7,325,756 B1 * | 2/2008 | Giorgis | A01G 25/09 239/304 |
| 7,360,494 B2 | 4/2008 | Martin | |
| 7,360,495 B1 | 4/2008 | Martin | |
| 7,438,006 B2 | 10/2008 | Mariman | |
| 7,451,712 B2 | 11/2008 | Bassett et al. | |
| 7,523,709 B1 | 4/2009 | Kiest | |
| 7,540,333 B2 | 6/2009 | Bettin | |
| 7,575,066 B2 | 8/2009 | Bauer | |
| 7,584,707 B2 | 9/2009 | Sauder | |
| 7,665,539 B2 | 2/2010 | Bassett et al. | |
| 7,673,570 B1 | 3/2010 | Bassett | |
| 7,743,718 B2 | 6/2010 | Bassett | |
| 7,870,827 B2 | 1/2011 | Bassett | |
| 7,918,285 B2 | 4/2011 | Graham | |
| 7,938,074 B2 | 5/2011 | Liu | |
| 7,944,210 B2 | 5/2011 | Fischer | |
| 7,946,231 B2 | 5/2011 | Martin | |
| 8,146,519 B2 | 4/2012 | Bassett | |
| 8,151,717 B2 | 4/2012 | Bassett | |
| 8,171,707 B2 | 5/2012 | Kitchel | |
| D663,326 S | 7/2012 | Allensworth | |
| 8,327,780 B2 | 12/2012 | Bassett | |
| 8,359,988 B2 | 1/2013 | Bassett | |
| 8,380,356 B1 | 2/2013 | Zielke | |
| 8,386,137 B2 | 2/2013 | Sauder | |

(56) References Cited

U.S. PATENT DOCUMENTS

| | | |
|---|---|---|
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,649,930 B2 * | 2/2014 | Reeve .................. A01B 69/008 701/23 |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,167,740 B2 | 10/2015 | Bassett |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 2002/0162492 A1 | 11/2002 | Juptner |
| 2004/0005929 A1 | 1/2004 | Piasecki et al. |
| 2006/0102058 A1 | 5/2006 | Swanson |
| 2006/0191695 A1 | 8/2006 | Walker et al. |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0060864 A1 | 3/2014 | Martin |
| 2014/0165527 A1 * | 6/2014 | Oehler .................. A01D 34/435 56/229 |
| 2014/0190712 A1 | 7/2014 | Bassett |
| 2014/0224513 A1 | 8/2014 | Van Buskirt |
| 2014/0224843 A1 * | 8/2014 | Rollenhagen ............ A01C 7/20 222/608 |
| 2014/0278696 A1 * | 9/2014 | Anderson ........ G06Q 10/06313 705/7.23 |
| 2015/0373901 A1 | 12/2015 | Bassett |
| 2016/0066498 A1 | 3/2016 | Bassett |
| 2016/0100520 A1 | 4/2016 | Bassett |
| 2016/0128263 A1 | 5/2016 | Bassett |
| 2016/0128265 A1 | 5/2016 | Bassett |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "New Efficiencies in Nitrogen Application," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "Sky Spy: Gulf War Technology Pinpoints Field and Yields," Top Producer, A Farm Journal Publication, Nov. 1991, pp. 12-14 (4 pages).
Borgelt, Steven C., "Sensor Technologies and Control Strategies For Managing Variability," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "Listen to Your Soil," Farm Journal Article, Jan. 1993, pp. 14-15 (2 pages).
Acu-Grain, "Combine Yield Monitor 99% Accurate? 'You Bet Your Bushels!!'" date estimated as early as Feb. 1993 (2 pages).
John Deere, New 4435 Hydro Row-Crop and Small-Grain Combine, date estimated as early as Feb. 1993 (8 pages).
Vansichen, R. et al., "Continuous Wheat Yield Measurement On A Combine," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13' Spading Closing Wheels Brochure, date estimated as early as Jun. 6, 2012, pp. 18-25 (8 pages).

(56) References Cited

OTHER PUBLICATIONS

Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

\* cited by examiner

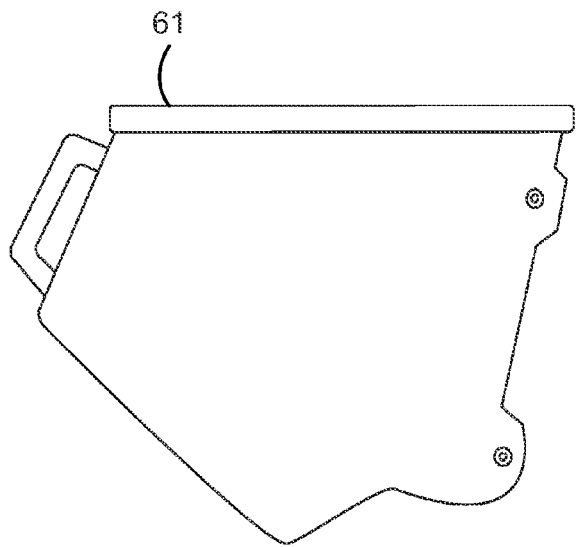
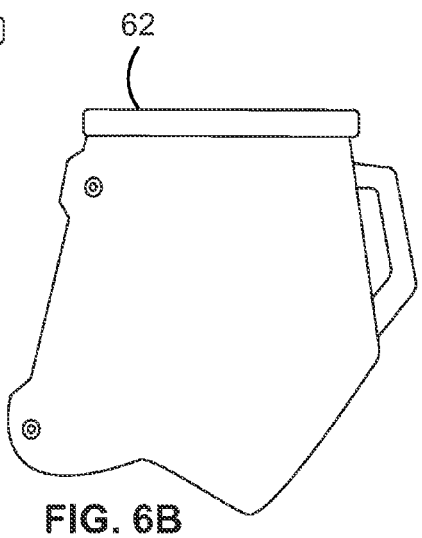
FIG. 6A  FIG. 6B
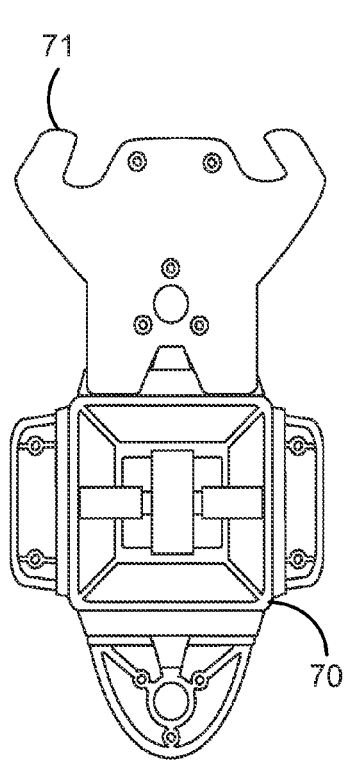
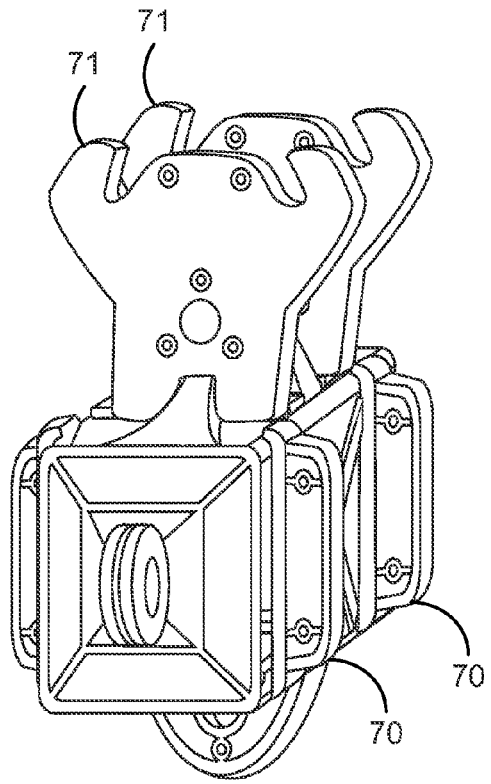
FIG. 7A  FIG. 7B

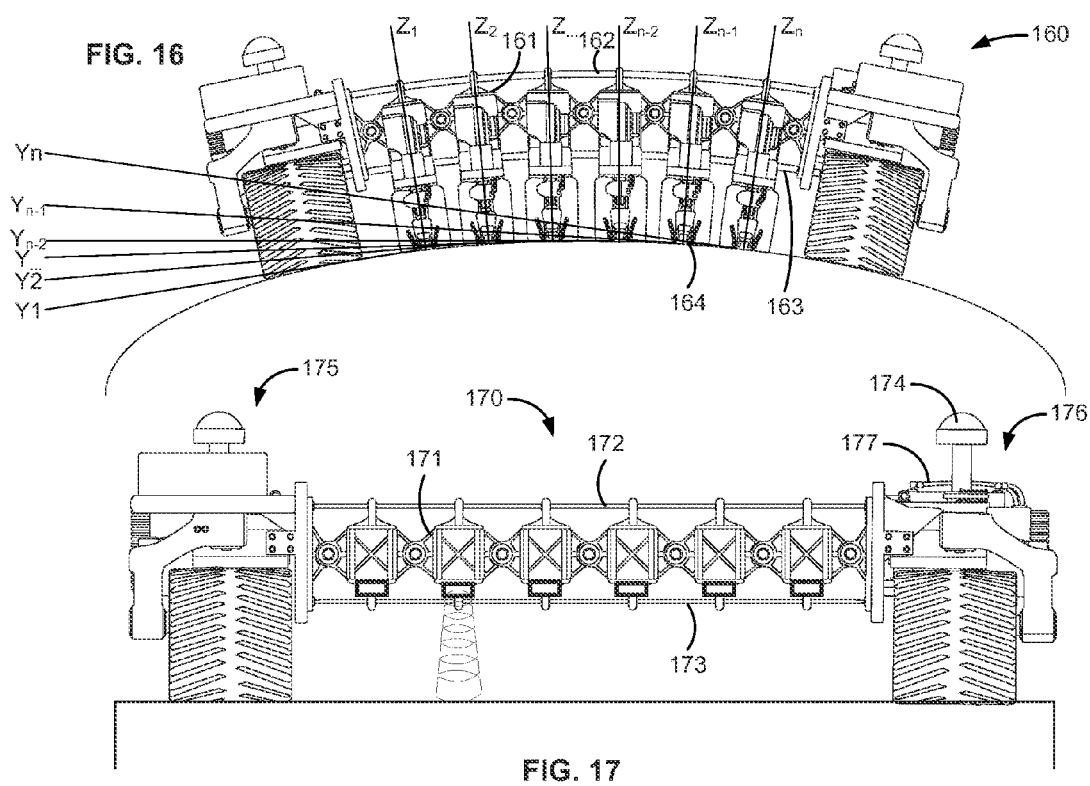

MODULAR AUTONOMOUS FARM VEHICLE

REFERENCE TO RELATED APPLICATION

This application is related to and claims priority to U.S. Provisional Patent Application Ser. No. 61/942,779 filed Feb. 21, 2014, and titled "Modular Autonomous Farm Vehicle," which is incorporated herein in its entirety.

FIELD OF THE INVENTION

The present invention relates to modular autonomous agricultural vehicles.

BACKGROUND OF THE INVENTION

Considerable investments are ongoing to develop autonomous or robotic agricultural equipment, particularly for harvesting operations. Robotic machines developed to date tend to be designed for specific applications, e.g., specific crops, rather than general purpose devices that can be utilized in a wide variety of applications, including not only different crops but also different field conditions and planting patterns.

SUMMARY OF THE INVENTION

In accordance with one embodiment, a modular autonomous agricultural vehicle includes a drive module having a frame, a ground-engaging element rotatably coupled to the frame, a power source, and a drive motor receiving power from the power source and coupled to the ground-engaging element for rotating the ground-engaging element; and at least one toolbar module detachably coupled to the frame for coupling the drive module to an agricultural implement or another toolbar module. One implementation includes multiple toolbar modules coupled to each other in series to form a modular toolbar, and each of the toolbar modules has the same width as one of the rows in an agricultural field to be worked. The adjacent toolbar modules may be coupled to each other to permit pivoting movement of the adjacent modules relative to each other, or to limit or prohibit the degree of pivoting movement of the adjacent modules relative to each other. The toolbar modules may carry ground-engaging implements, with a cable extending through all the toolbar modules to hold the modules together while allowing the toolbar to flex to follow the contour of the ground engaged by said implements. Alternatively, the modular toolbar may have a driveshaft extending through the length of the toolbar and coupled to a drive motor on a drive module, for driving a driven module attached to the modular toolbar and coupled to the driveshaft.

In one particular implementation, the ground-engaging elements are mounted for movement between an operating position in which the ground-engaging elements are positioned for traversing an agricultural field, and a retracted position in which the ground-engaging elements are positioned to make the vehicle more compact for stowage or transporting. The ground-engaging elements may be pivotably coupled to the frame of the drive module.

BRIEF DESCRIPTION OF THE DRAWINGS

FIG. 6A is a side elevation of a commodity hopper.

FIG. 6B is a side elevation of another commodity hopper.

FIG. 7A is a side elevation of toolbar module connected to a support for a commodity hopper.

FIG. 7B is a perspective view of multiple toolbar modules coupled to each other in series, with each module also connected to a support for a commodity hopper.

FIG. 16 is a front elevation of a toolbar formed from multiple toolbar modules and connected at opposite ends to drive modules on terrain having a curved cross section.

FIG. 17 is a front elevation of a toolbar formed from multiple toolbar modules and connected at opposite ends to drive modules on terrain having a flat surface, with distance sensors on the bottoms of the toolbar modules.

DETAILED DESCRIPTION OF ILLUSTRATED EMBODIMENTS

Figure 1A:
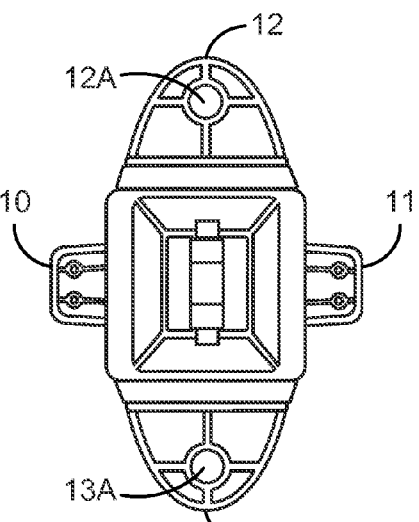
FIG. 1A is a side elevation of a toolbar module for use in forming a toolbar of any length from multiple modules interconnected by a pair of tensioning cables, and having a pair of side flanges for attaching the module to a mating plate.

The design of the tractor-less autonomous farm vehicles described below are "modular" because the frame is made from two or more modules. For example, different types and sizes of toolbars can be formed from multiple toolbar modules, which in turn can be coupled to drive modules that include both a power source and ground-engaging wheels or tracks driven by the power source. The width of the vehicle is therefore adjustable and can be sized for different needs by coupling different numbers of the modules to each other in different configurations. In one embodiment, the modules are coupled to each other with a single large diameter bolt that is very long and simultaneously spans all the modules.

Frame section modules define the row spacing with their width and also provide support to commodity modules and guide mechanical shafts that can extend through multiple modules. Frame-mounted attachments, such as like the Dawn ZRX zone roller or the Dawn CFX fertilizer opener, can be mounted directly to the frame section modules. Commodity modules, such as hoppers or tanks that clip onto quick attachment clips on frame section modules, can carry dry fertilizer or seed or fluid materials such as liquid fertilizers. The modules can be in widths as narrow as a single row or frame section, or span across multiple rows when a farmer wants to create different patterns of seed and fertilizer through different fields. Different patterns may be desired for side dress, cover crop inter-row seeding, or growing arbitrary row by row patterns of different types of crops. For example, a farmer might want to plant a row of corn, then a row of soybeans and so on. The frame sections can have any number of quick attachments for different commodity modules, so that different combinations of cover crop medleys and mixtures of seed and fertilizer can be created. Hoses carry seed and fertilizer from the commodity modules to the seeding and fertilizing row units.

Implements are mounted to the frame section modules via an implement section module. These modules make it easy to make further modular systems where the same general frame setup can be converted from planter unit to tillage unit, to side dress fertilizer coulter, etc. The implement section modules can have different offset lengths so as to allow changes in stagger and position of row units next to adjacent row units.

The drive modules are typically the end modules, which have two track or wheel assemblies connected via link arms to a support structure that is attached to opposite sides or ends of a modular frame or toolbar. To provide weight for traction over the drive system, the drive motor, whether electric or diesel, may be located directly over the tracks or wheels on the drive modules. A machine may have only one motor even though there are two or more drive modules. The frame modules have holes through them, preferably with support bearings, that allow for the transmission of power from a drive module on one end to a drive module on another end via a drive shaft. The drive module also preferably has the tracks or wheels on a linkage that can pivot, and the tracks or wheels can also preferably pivot to steer. This allows the track or wheel assemblies to extend and rotate to become narrower for transport on the road or to be transported on a trailer. Each drive module preferably has a GPS receiver centered on the track center line. Multiple GPS receivers allow the direction and pitch of the vehicle to be accurately monitored.

Figure 1B:
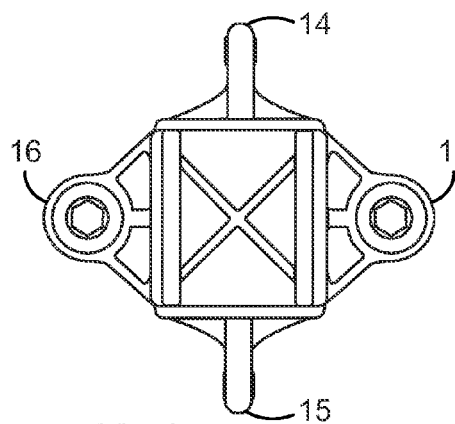
FIG. 1B is a rear elevation of the toolbar modules shown in FIG. 1A having modified side flanges for connecting adjacent modules while permitting pivoting movement of the connected modules relative to each other.
Figure 1C:
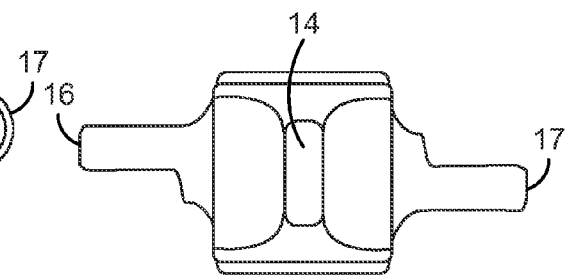
FIG. 1C is a top plan view of the toolbar module shown in FIG. 1B.

FIGS. 1A, 1B and 1C illustrate examples of frame section modules in the form of toolbar modules, each of which can be a toolbar module that can be coupled to similar modules to construct a customizable framework for row crop tools and related items such as commodity hoppers for seed and fertilizer.

FIG. 1A illustrates a toolbar module that has a pair of tool-mounting side flanges 10 and 11, as an alternative to U-bolt fastened tools. Top and bottom flanges 12 and 13 include large apertures 12a and 13a for coupling the module to large diameter cables or rods that run the full length of a modular toolbar through the apertures of all the individual modules forming the toolbar. Actuators at both ends of the toolbar, on the drive modules, apply appropriate tension to the cable that interconnects the modules, and allows the toolbar to conform to the curvature of the terrain engaged by the wheels or tracks in the drive modules, as described in more detail below.

FIGS. 1B and 1C illustrate a toolbar module that has top and bottom flanges 14 and 15 similar to those of the module shown in FIG. 1A. The side flanges 16 and 17, however, are much wider side flanges 16 and 17 to allow for relative pivoting movement of adjacent modules relative to each other, as described in more detail below. The overall width of this module is preferably the same as a standard field row width, e.g., 15", 20", 22", 30" etc., so there is one module for each row of the farm field being worked. As can be seen in the top plan view in FIG. 1C, the flanges 16 and 17 are laterally offset from each other so that the flanges of adjacent modules can slide over and register with each other. Then the overlapping flanges of adjacent modules can be connected with a single large-diameter pivot pin or bolt, which permits pivoting movement of the two modules relative to each other, around the axis of the connecting pin or bolt. The use of toolbar modules also provides the ability to vary row width by either direct mechanical means, or through the use of automated, or manually adjustable actuators and/or fasteners.

Figure 2A:
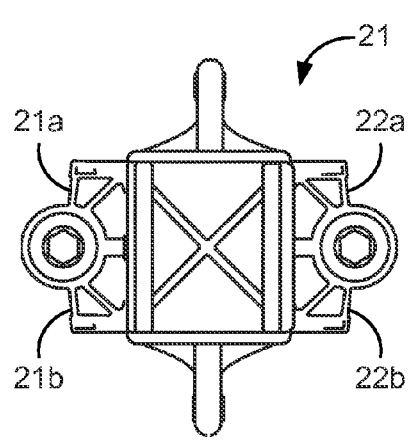
FIG. 2A is a rear elevation of a modified version of the toolbar modules shown in FIG. 1B, for limiting pivoting movement of connected modules relative to each other.
Figure 2B:
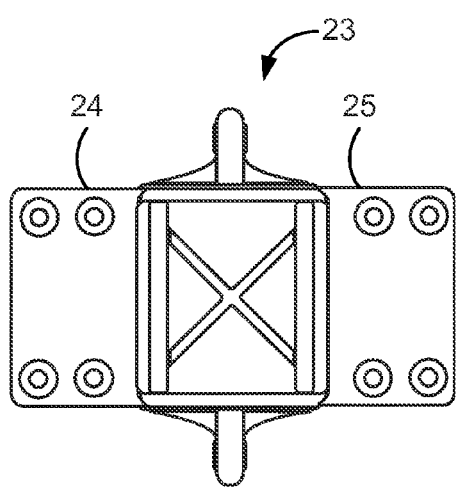
FIG. 2B is a rear elevation of a further modified version of the toolbar module shown in FIG. 1B, for preventing pivoting movement of connected modules relative to each other.

The toolbar module shown in FIG. 1B allows large angular displacements of the module (off horizontal) relative to adjacent modules to which this module is connected, so that the modules in a toolbar can articulate relatively freely. FIG. 2A illustrates a modified toolbar module 20 that includes mechanical stops 21a, 21b and 22a, 22b that limit such relative angular displacements to prevent excessive toolbar curvature. FIG. 2B illustrates a further modified module 23 that allows virtually no such displacements because adjacent modules are rigidly fixed together by bolting end plates 24 and 25 to overlapping end plates on adjacent modules.

Figure 3A:
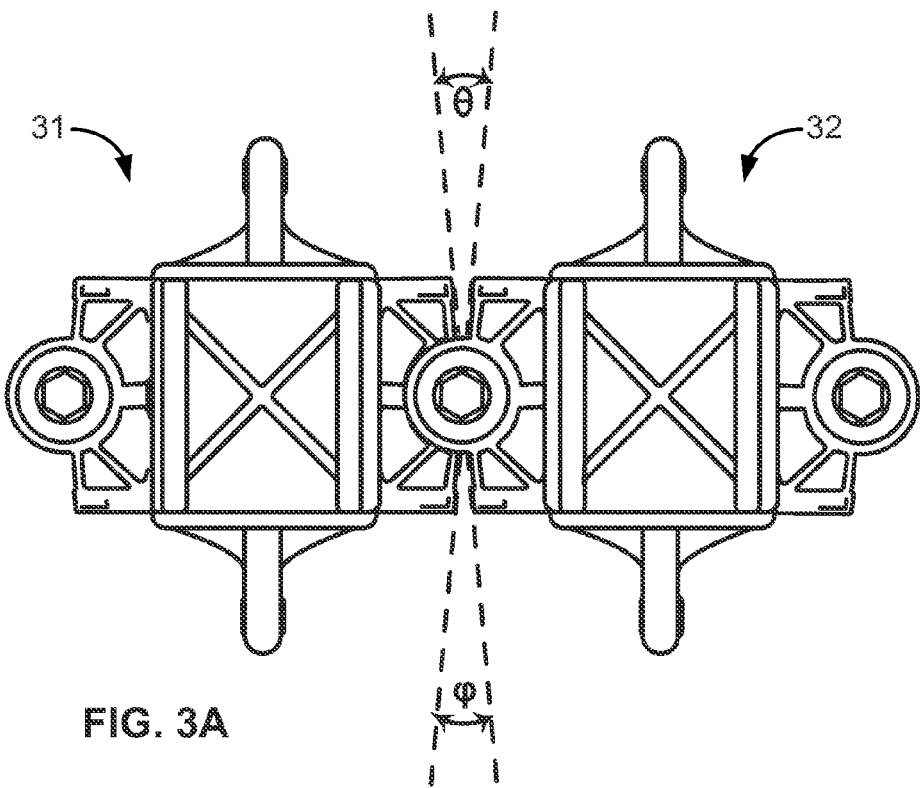
FIG. 3A is a rear elevation of two of the toolbar modules show in FIG. 2A coupled to each other.
Figure 3B:
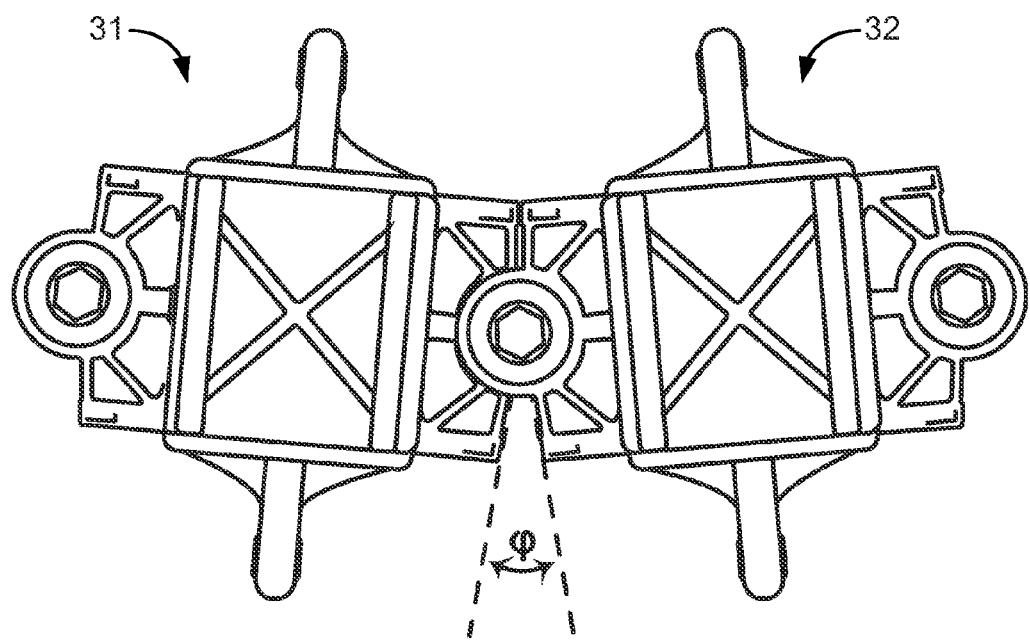
FIG. 3B is a rear elevation of two of the toolbar modules shown in FIG. 2A coupled to each other, and illustrating the maximum pivoting movement of the two modules relative to each other.

FIGS. 3A and 3B illustrate the restricted displacement permitted when two modules 31 and 32 with the design shown in FIG. 2A are connected to each other. FIG. 3A shows the gaps θ and φ that exist between the two modules when there is no relative displacement, and FIG. 3B shows the maximum increased gap φ attainable when the two modules 31 and 32 are tilted in opposite directions. The mechanical stops φ the adjacent modules prevent the toolbar from exceeding a curvature that would impair the ability of the implements attached to that toolbar from adequately performing a field operation.

Figure 4A:
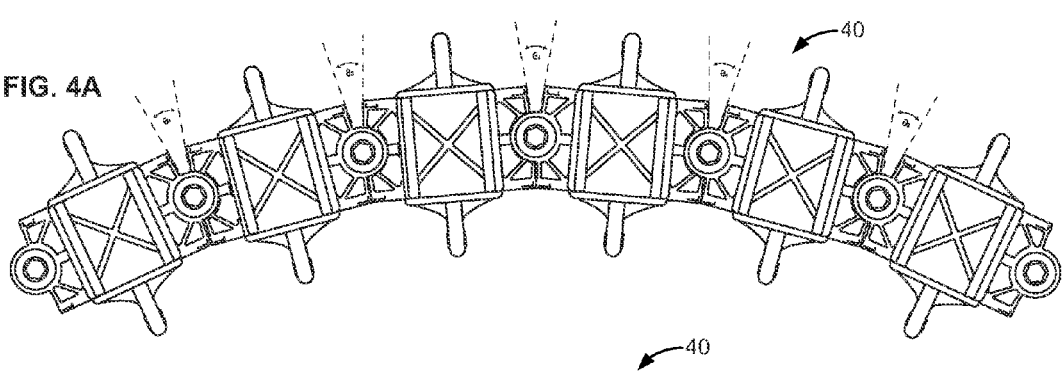
FIG. 4A is a rear elevation of six of the toolbar modules shown in FIG. 2A coupled to each other in series, with each adjacent pair tilted relative to each to the maximum extent and in the same direction so as to form an overall arcuate configuration of the modular toolbar.
Figure 4B:
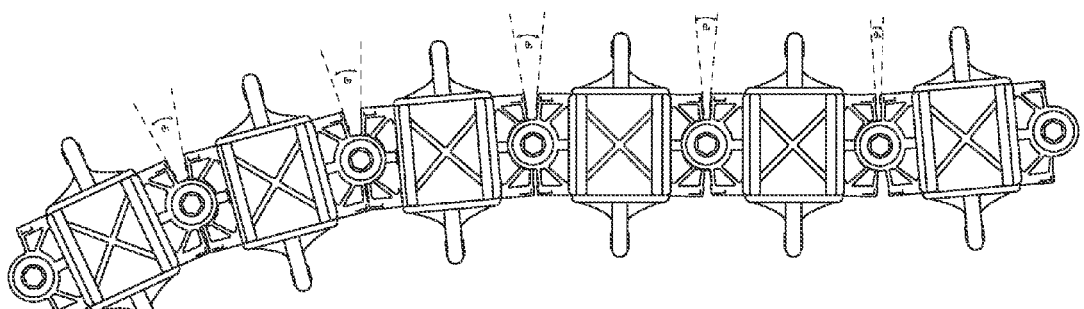
FIG. 4B is the same configuration of six toolbar modules shown in FIG. 4A, but with different adjacent pairs tilted in different directions or by different amounts.

FIGS. 4A and 4B illustrate the articulation permitted by a toolbar 40 formed by a series of the toolbar modules shown in FIGS. 3A and 3B. In FIG. 4A, the toolbar 40 has a constant curvature along its entire length, as would be desirable when the implements carried by the toolbar are traversing a hill in a farm field. In FIG. 4B, the left portion of the toolbar is curves downwardly and the right portion curves upwardly, as would be desirable when the implements carried by the toolbar are traversing terrain having that same contour. As described in more detail below, the toolbar 40 shown in FIGS. 4A and 4B may employ a tensioning cable system to regulate the forces on the toolbar 40 from row to row to allow individual rows to closely follow ground contours, by ensuring that the median plane of the row unit remains orthogonal to the nominal surface of the ground contacting the gauge wheels.

Figure 5A:
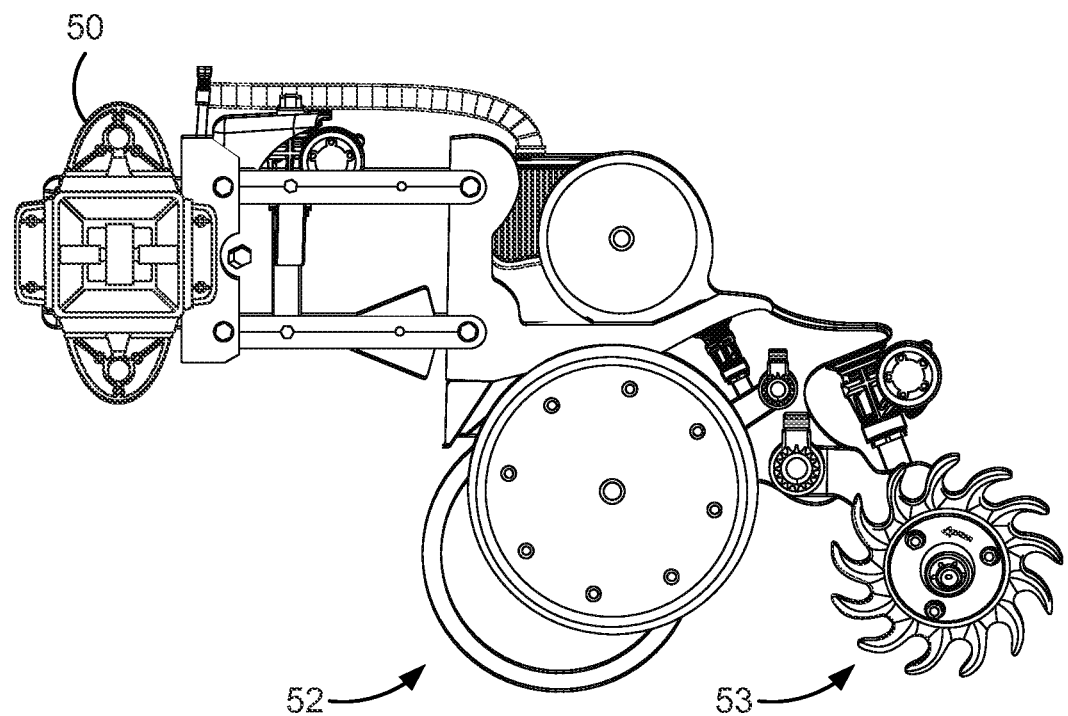
FIG. 5A is a side elevation of a modular toolbar carrying a planter row unit.
Figure 5B:
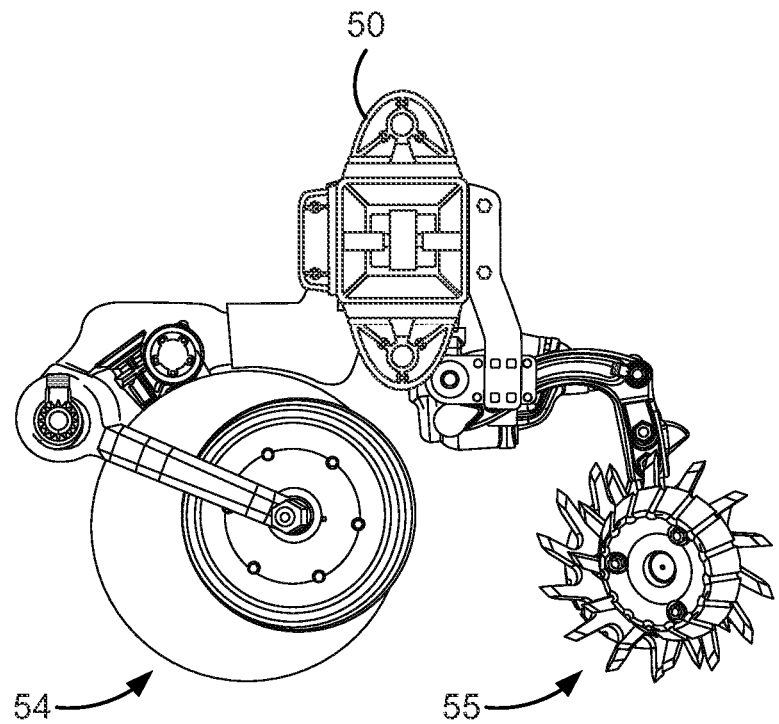
FIG. 5B is a side elevation of a modular toolbar carrying a fertilizer coulter and a row cleaner.

FIG. 5A illustrates a modular toolbar 50 carrying a planter row unit 51 that includes both furrow-opening and furrow-closing wheels 52 and 53 attached to the trailing side of the toolbar. FIG. 5B shows the same toolbar 50 with a fertilizer coulter 54 attached to one side of the toolbar 50 and a row cleaner 55 attached to the opposite side of the toolbar.

FIGS. 6A and 6B illustrates a pair of commodity hoppers 61 and 62 adapted to be attached to hopper supports on a modular toolbar. The modular hoppers 61 and 62 are suitable for carrying, for example, seed and granular fertilizer.

FIGS. 7A and 7B illustrate a segment of a modular toolbar 70 of the type illustrated in FIGS. 4A and 4B, equipped with a pair of hopper supports 71 and 72 for receiving the hoppers 61 and 62 shown in FIGS. 6A and 6B. The hoppers, of course, may have a variety of different configurations for various seed, fertilizer and pesticide commodities.

Figure 8:
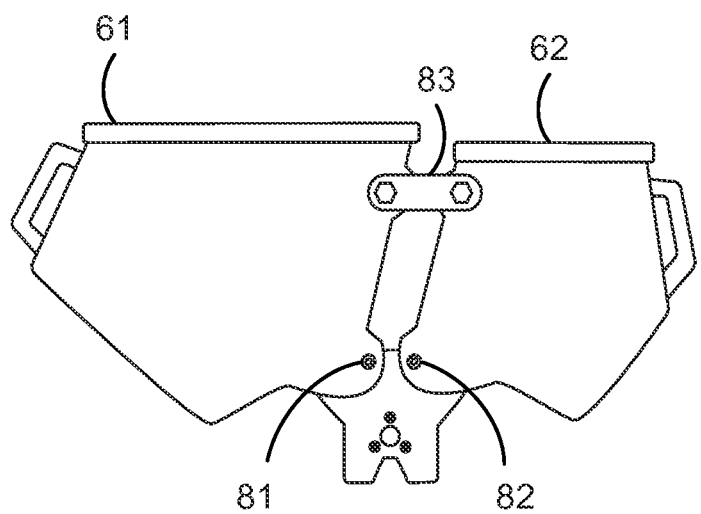
FIG. 8 is a side elevation of two commodity hoppers mounted on a hopper support.

FIG. 8 illustrates the hoppers 61 and 62 of FIGS. 6A and 6B installed on the supports 71 and 72 shown in FIGS. 7A and 7B. A pair of bolts 81 and 82 fasten the bottom corners of the hoppers 61 and 62 to the upper portions of the respective supports 71 and 72, and a pivoting link 83 is bolted to the upper portions of the two hoppers to connect them to each other.

Figure 9:
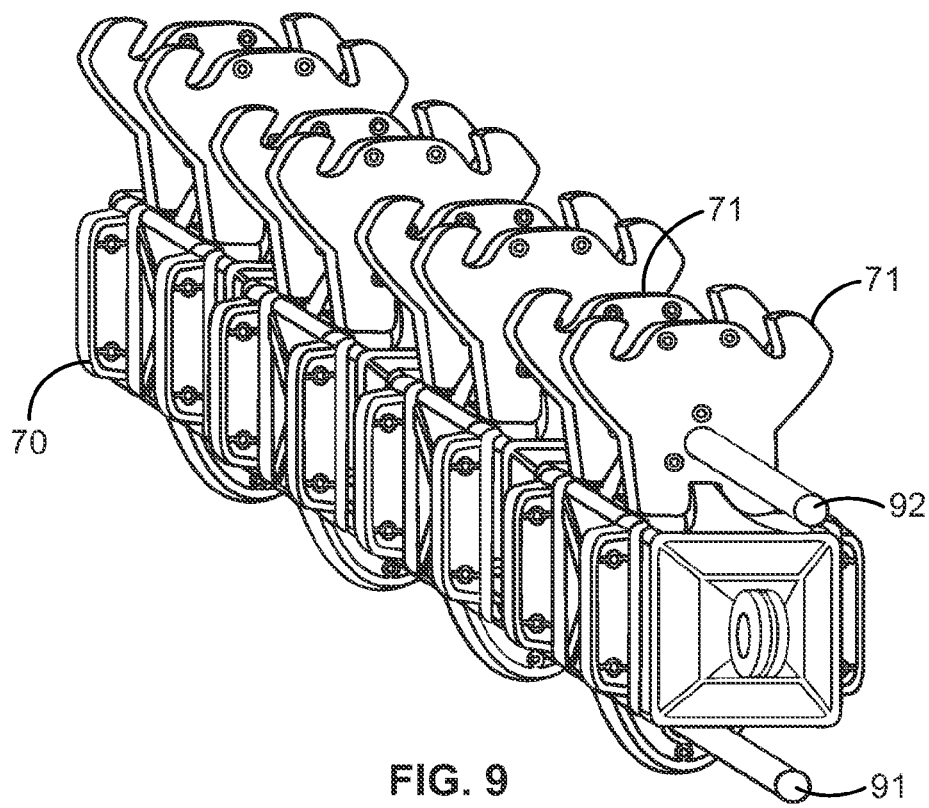
FIG. 9 is a perspective view of a modular toolbar equipped with hopper supports interconnected by a pair of cables.

FIG. 9 illustrates a modular toolbar formed from multiple modules 70 equipped with multiple hopper supports 71, with a pair of cables 91 and 92 extending through registered apertures in the toolbar modules 70 and the hopper supports 71, respectively.

Figure 10:
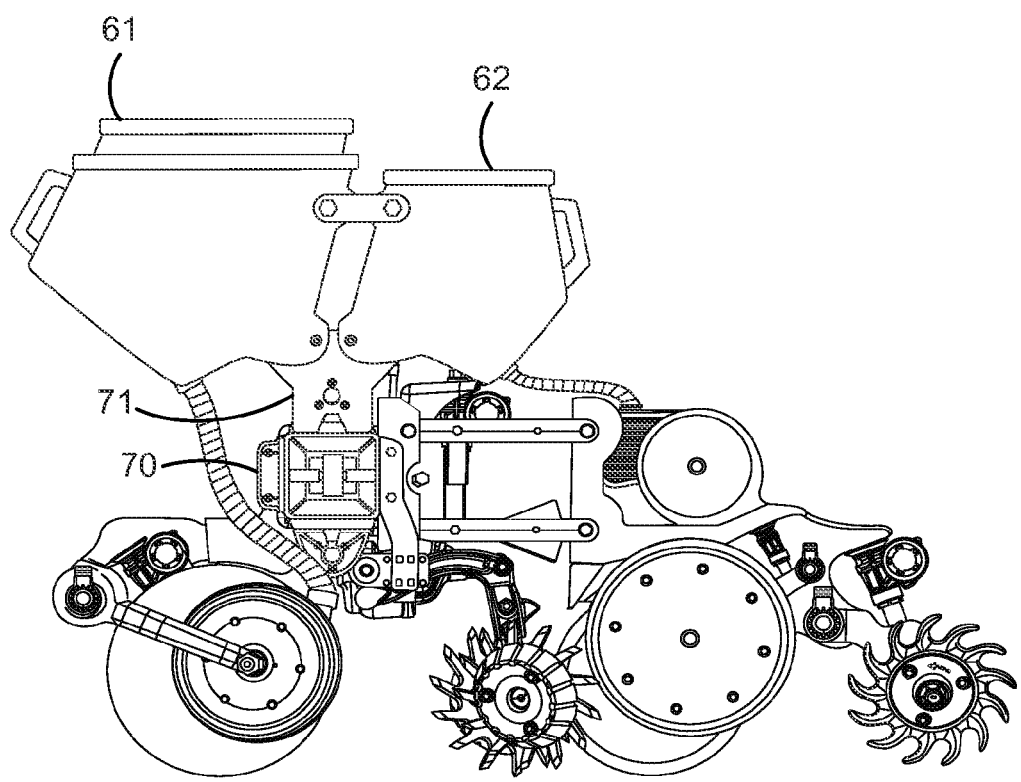
FIG. 10 is a side elevation of a toolbar module connected to multiple planter tools and commodity hoppers.

FIG. 10 illustrates a complete modular planter row unit that includes the modular toolbar 70 of FIG. 9 equipped with the supports 71 fastened to the hoppers 61 and 62, and all the row unit implements shown in FIGS. 5A and 5B.

Figure 11:
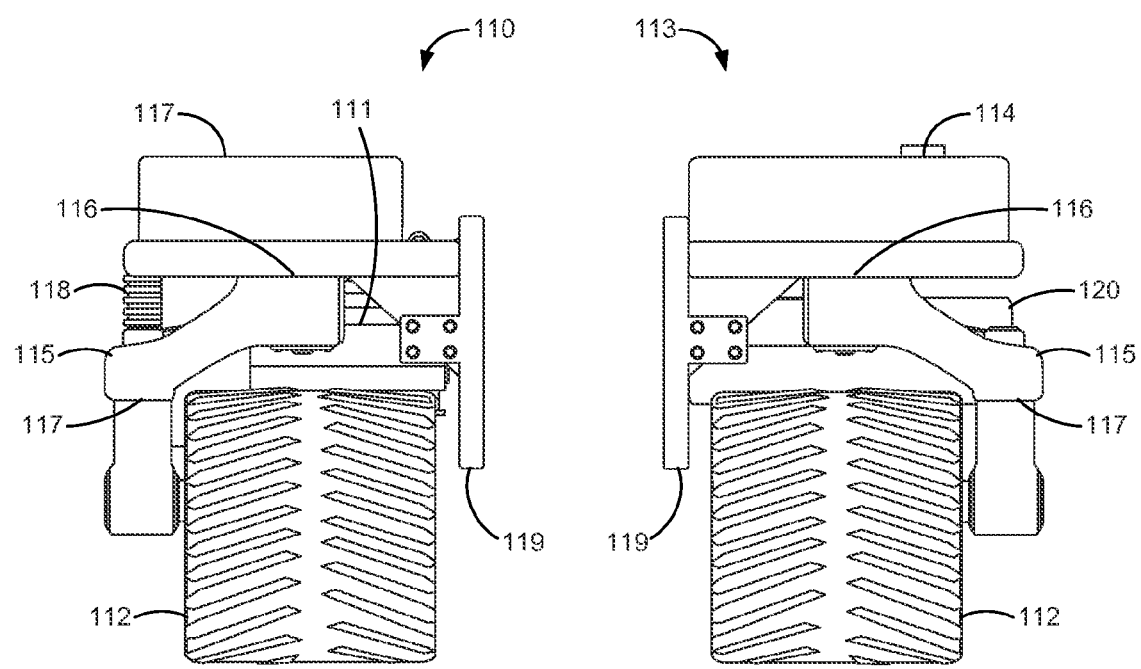
FIG. 11A is a front elevation of a pair of drive modules configured to be attached to a first end of one or more toolbar modules.
FIG. 11B is a front elevation of a pair of drive modules configured to be attached to a second end of one or more toolbar modules.

The modular systems described above require an engine to provide both direct mechanical motion, and to serve as a power source for both electric and hydraulic tool systems. FIG. 11A illustrates a drive module 110 that includes such an engine 111, which drives both a power plant 117 for generating electrical power, as well as the wheels 112 on both the drive module 110 and a "driven" module 113 shown in FIG. 11B. The driven module 113 includes a fuel tank 114 in place of the engine 111. The driver module 110 delivers power through the modular toolbar by direct mechanical drive, or by electric cable, or by hydraulic hose.

The "driven" module 113 preferably includes a generator/alternator 120 and associated battery pack. The generator uses fuel to generate DC electrical power for storage in the battery pack. Alternatively, an alternator may be driven by the engine to produce AC electrical current that is rectified for storage in the battery pack.

Driver modules deliver power through the toolbar segments by direct mechanical drive, or by electric cable, or by hydraulic hose. Alternatively, these modules may be driven entirely by electric motors. Fuel tanks are replaced by large battery packs.

It will be understood that the wheels 112 in both modules could be replaced with ground-engaging tracks. In either case, the ground-engaging elements (wheels or tracks) are mounted to permit pivoting over 90° to allow the attached toolbar to closely follow field contours, and to allow for simple loading of the toolbar onto a trailer for relocation to a different field.

In FIGS. 11A and 11B, each wheel 112 is journaled on the lower end of a support rod 115 whose upper end is pivotably coupled to the frame to form a primary pivot 116 for the corresponding wheel 112. The axis around which each support arm 115 pivots is located directly above the middle of the wheel, to place the center of gravity directly over the center of the wheel base. The lower portion of each support arm 115 also includes a secondary pivot 117 that provides the corresponding wheel 112 an additional degree of freedom to allow for greater mobility in the field. This secondary pivot 117 allows the wheel 112 to pivot 90° from its normal outboard field position to a retracted inboard position, for loading and transport purposes.

The drive module 110 also includes a hydraulic pump 118 to supply hydraulic actuators, both on the toolbar itself and in the row units carried by the toolbar. For example, the down pressure on each ground-engaging element of a planter row unit can be controlled by a separate hydraulic actuator. The frame of the drive module includes an attachment plate 119 for attaching the drive module 110 to a modular toolbar.

Figure 12:
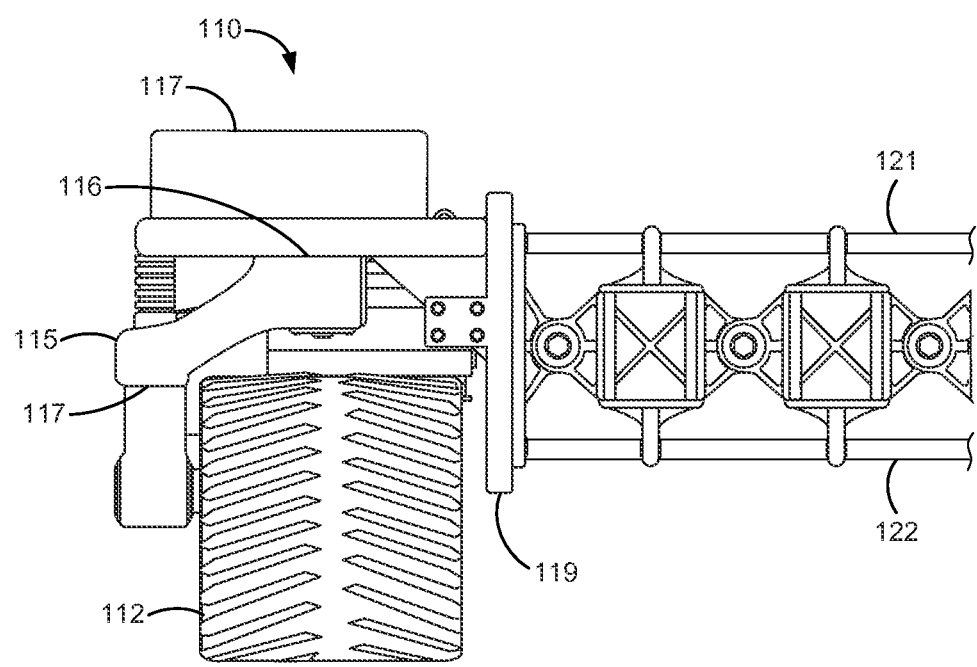
FIG. 12 is a front elevation of a drive module connected to a series of interconnected toolbar modules.

FIG. 12 illustrates the drive module attached to a modular toolbar via the attachment plate 119, which is detachable from the drive module to enable the user to easily change attachment brackets for different type of toolbar modules. Also connected to the drive module 100 are tension cables 121 and 122 that control the toolbar arc.

Figure 13A:
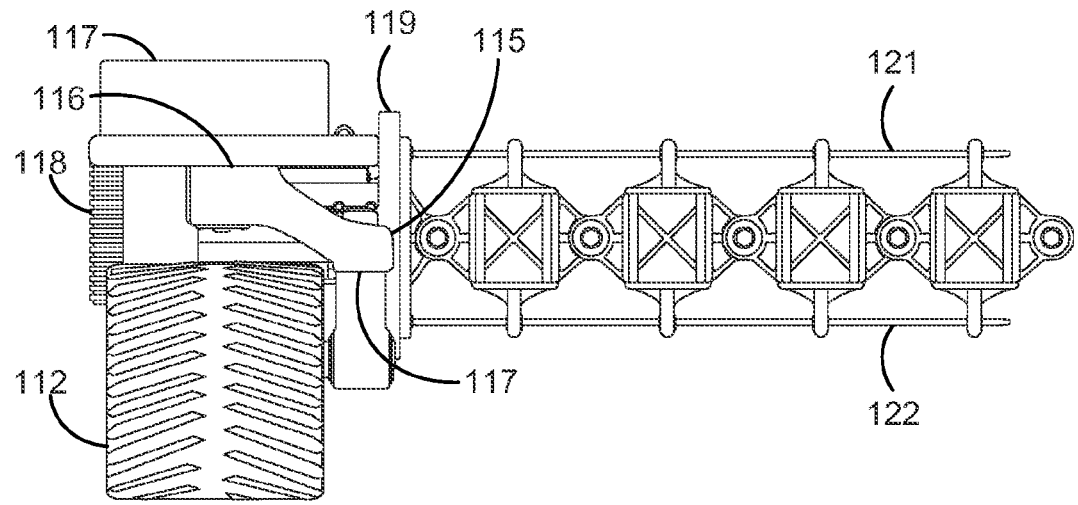
FIG. 13A is a front elevation of a modified drive module connected to a series of interconnected toolbar modules.

FIG. 13A illustrates a drive module like the one shown in FIG. 12 except that the support arm 115 is attached to the inboard side of the wheel 112 rather than the outboard side, so the wheel is spaced farther away from the end of the modular toolbar.

Figure 13B:
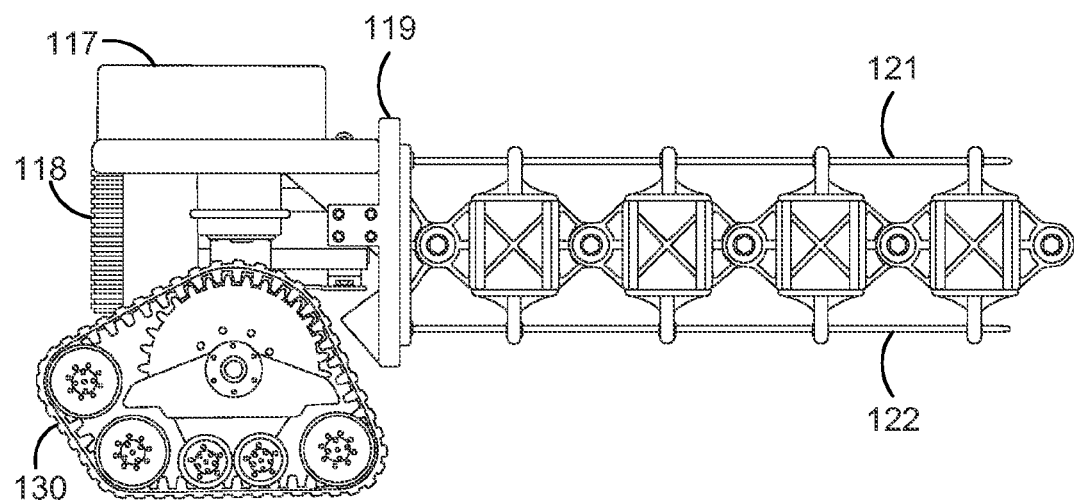
FIG. 13B is a front elevation of another modified drive module connected to a series of interconnected toolbar modules.

FIG. 13B illustrates a drive module equipped with wide tracks 130, instead of wheels, as the ground-engaging drive elements. Different tracks and wheel modules may be quickly coupled to the axle drive shafts. Internal drive shafts deliver differential power to the wheels or tracks and are able to rotate on both pivots 116 and 117 to allow for proper distribution of force from the toolbar around corners and over other irregularities in the field (e.g., terraces, waterways, etc.). The drive shaft runs through the wheel supports 115, with bevel gears at each bend allowing for the transmission of power through the full range of motion.

Figure 14:
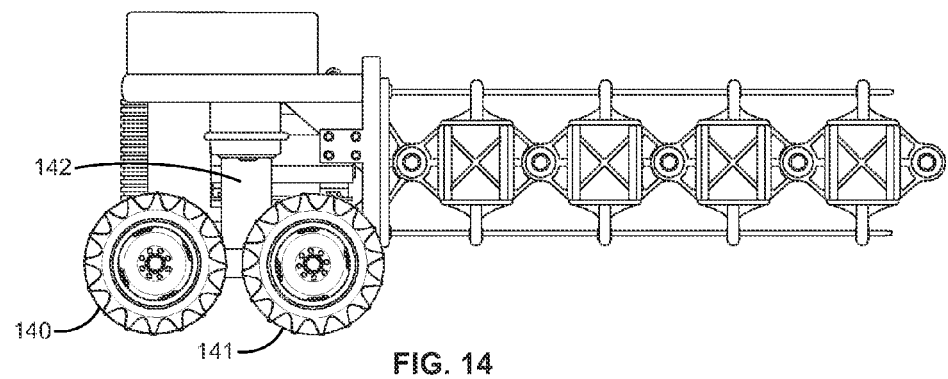
FIG. 14 is a front elevation of a series of interconnected toolbar modules connected to a drive module having multiple wheels.

FIG. 14 illustrates a drive module that has two wheels 141 and 142 suspended from a single support arm 142. FIG. 14 shows the two wheels in their stowed position, but by turning the support arm 90° the wheels are pivoted to their operating position. The wheels may be aligned with each other in the direction of travel, or they may be laterally offset from each other by one or more row widths.

Figure 15:
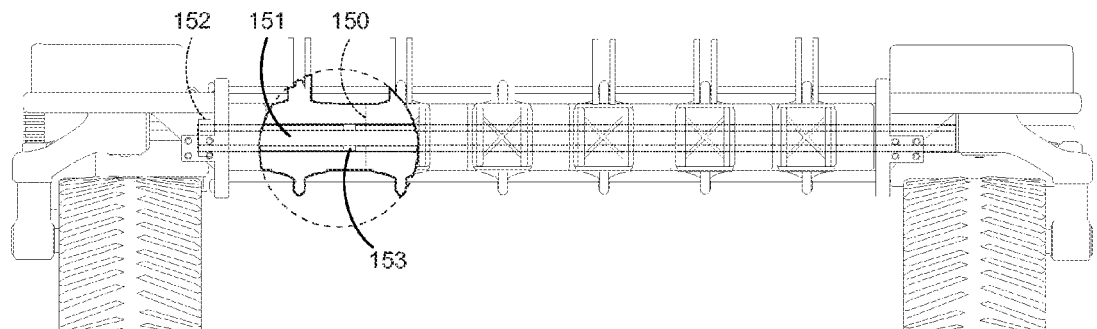
FIG. 15 is a front elevation of a series of interconnected toolbar modules connected to a drive module having a drive shaft extending through the length of the toolbar for driving a wheel on a driven module, partially sectioned to show the drive shaft.

FIG. 15 illustrates a modular toolbar having a transverse drive shaft extending through the entire length of the toolbar, which allows for the transfer of power by direct mechanical means through the toolbar from a drive module equipped with a motor at one end of the toolbar to a driven module that has no motor, but does have tracks or wheels and other components that require engine power. The cutaway 150 shows a driveshaft 151 running through cavities located inside the toolbar modules. This driveshaft 151 may be either a single shaft, or several shafts mechanically coupled together to allow for limited drive shaft flexibility. A modular junction 152 permits a joint at the transfer case of the engine to be coupled to the transverse driveshaft 151. Heavy duty bearings 153 equipped with rotary encoders support the transverse driveshaft 151 and can provide feedback information to the drive module controllers.

FIG. 16 illustrates a complete modular toolbar 160 with high travel toolbar modules 161 and/or with transverse tension cables 162 and 162. This illustration shows the implementation of a tension cable, or rod, that changes tension depending on ground contours. Here, $z_1$-$z_n$ represent the median planes of a series of row crop tools, shown here as planter row units 164, and $y_1$-$y_n$ identifying axis lines orthogonal to the corresponding median planes z planes. The axis lines are also tangent to the nominal surface of the ground over a distance "d." Actuators located on the drive modules apply additional strain or relax the tension cables. Relaxing the tension cable allows the median plane of the row unit to remain perpendicular to an idealized line tangent to the curve of the ground across the bottom of the gauging member of the row unit.

FIG. 17 illustrates a complete modular toolbar 170 with high travel toolbar modules 171, transverse tension cables 172 and 173, and a. GPS antenna 174 on at least one of the drive modules 175 and 176 attached to opposite ends of the tool bar. The GPS antenna is used to ensure that the drive modules closely follow the planned course. An actuator 177 on the drive module 176 controls the tension on the cables 172 and 173. Attached to the bottom of each toolbar module 171 is a distance sensor 178 that includes an integral amplifier and remote telemetry unit ("RTU"). Each distance sensor 178 detects the distance from the bottom of the toolbar module to the ground, and sends information via its RTU to a master telemetry controller ("MTU"). Signals sent to the MTU are processed and sent to the actuator 177 to control the force on the tension cables 172 and 173.

Figure 18:
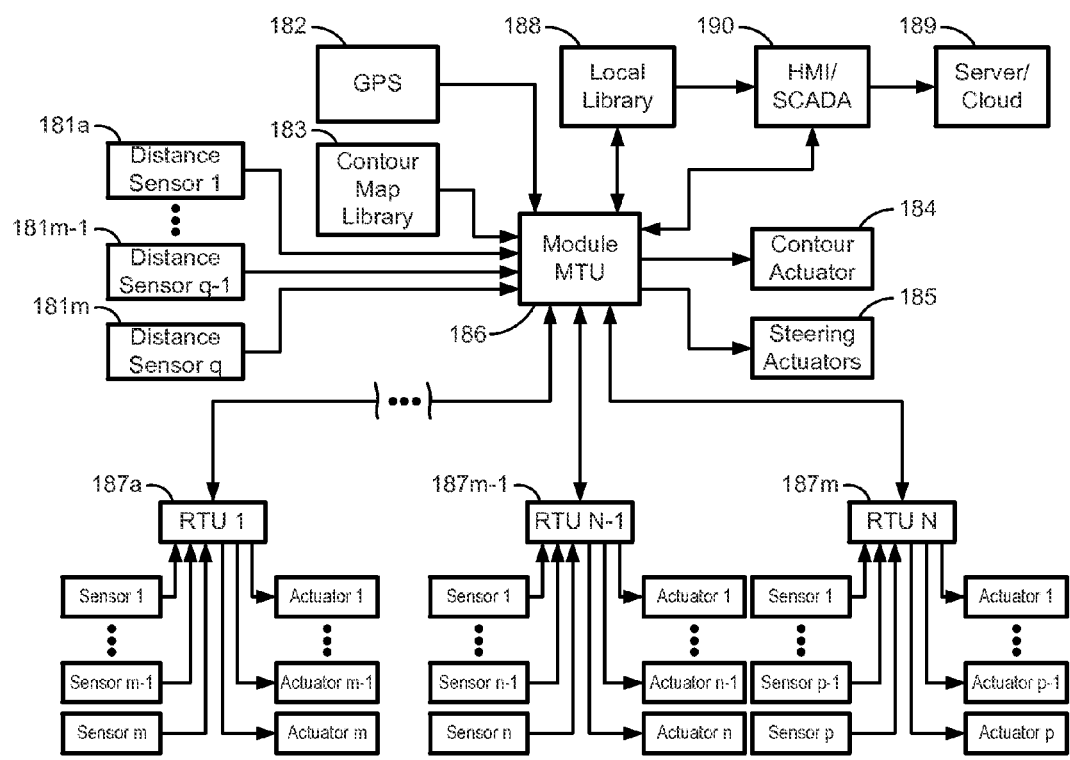
FIG. 18 is an electrical schematic diagram of an electrical system for an autonomous agricultural vehicle.

FIG. 18 is a schematic diagram of an exemplary electrical system for an autonomous vehicle such as those illustrated in FIGS. 17A and 17B, equipped with an array of sensors 181$a$ . . . 181$n$-1, 181$n$ configured so that they can receive real-time information regarding variables such as relative position, roll, pitch, yaw, vertical and longitudinal acceleration, system pressure, and applied force from associated actuators. The system also includes a GPS receiver 182, a contour map library 183, contour and steering actuators 184 and 185, local conditioners/amplifiers, processors, and their associated actuators. All these elements interface with an implement or vehicle master telemetry unit (MTU) 186.

The MTU 186 communicates with multiple remote telemetry units (RTUs) 187$a$ . . . 187$n$-1, 187$n$, each of which receive signals from multiple sensors 1 . . . m, 1 . . . n or 1 . . . p and transmits signals to multiple actuators 1 . . . m, 1 . . . n or 1 . . . p.

All information streaming from the various sensors may be logged and stored in either a local library 188 or a cloud-based library 189, via a human machine interface (HMI) or supervisory control (SCADA) for use in post-operation analytics. Additionally, information from previous years may be used for control algorithms in subsequent years.

To accommodate expansion or reduction of the number of rows, all tools attached to a particular toolbar module have an associated, local RTU which may include power supplies for module sensors, amplifiers for sensor signals, processors for control algorithms, and controller area network (CAN) communication, either hard wired or equipped with RF transceivers for communication with the implement MTU. The MTU sends and receives information via RF transceivers, typically using Bluetooth. Protocols to ease communication with an existing Bluetooth-enabled device such as a mobile phone, mobile wearable device (e.g., smart-watch, smart-glasses) tablet computer or laptop computer.

The HMI is typically an existing mobile device, equipped with RF transceivers suitable for local communication, and all implement setup procedures, operational controls, diagnostics, and in some cases real-time analytics may be viewed, and governed by, that mobile device. The user has the option to store incoming CAN information locally, or to transmit that data for storage on a cloud-based server.

The individual row modules (RTUs) themselves may also possess some of the capabilities of the MTU/HMI control system. Some systems may benefit from the complete decentralization of the computing system. In these instances, one or more RTUs behave as a master unit, and other RTUs report to the master RTU for communication with the HMI, or other supervisory controller.

An individual RTU will be associated with one or more of a row module's sensors and/or actuators. In some cases the information collected from a single sensor will be conditioned, and processed for delivery to a single actuator. In other instances, multiple sensors may have their status sampled, and operated on, to provide a driver signal for a single actuator. There are also some actuators that benefit from the collection of data received from multiple sensors, to be operated on, and superposed to generate a hybrid signal that controls one or more actuators.

In addition to the standard RTUs found on the row unit modules, the power plant/tractor modules will also have an associated RTU. Like the row unit module RTUs, these computers control the activity of the power plant/tractor drive modules. They receive information from local sensors on the module, as well as information streaming in from the implement CAN and/or the cloud and/or some other local library, such as GPS coordinates, vehicle pitch, or forward velocity. Plant/tractor RTUs are devoted to the control of tractor actuators for steering, and for force adjustments on the tensioning rods discussed above.

Sensors located on each row module are surveyed via the implement CAN and are processed by either a RTU acting as a master controller, or in the implement MTU. Information from these units and existing maps in an available library, and GPS information, allow the plant/tractor RTU control the steering actuators, the throttle control actuators and brake actuators. These RTUs also house collision avoidance sensors, and have processes to compensate for in-field inanimate obstacle detection, and complete operation shutdown should sensors detect any sign of an animate obstacle in the field. Such stereoscopic sensors may include any of a variety of specialized laser range finders (e.g., Lidar) or specialized ultrasonic rangefinders, or other sensors which give real-time feedback of three-dimensional objects.

Figure 19A:
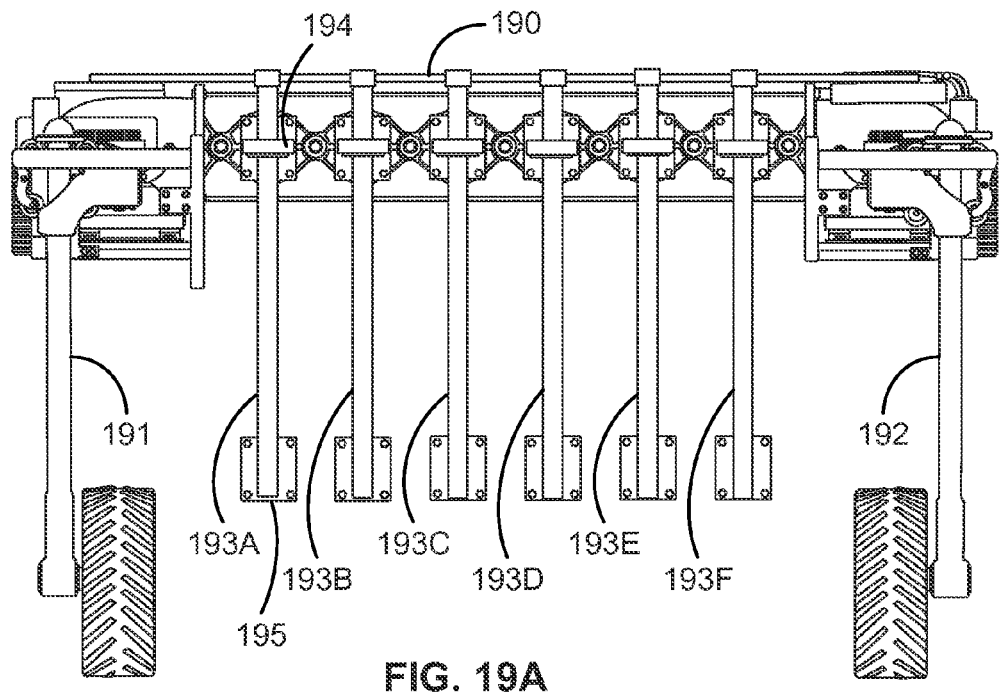
FIG. 19A is a front elevation of a modular toolbar attached at opposite ends to a pair of drive modules having vertically adjustable wheels, with the wheels shown in a raised position.
Figure 19B:
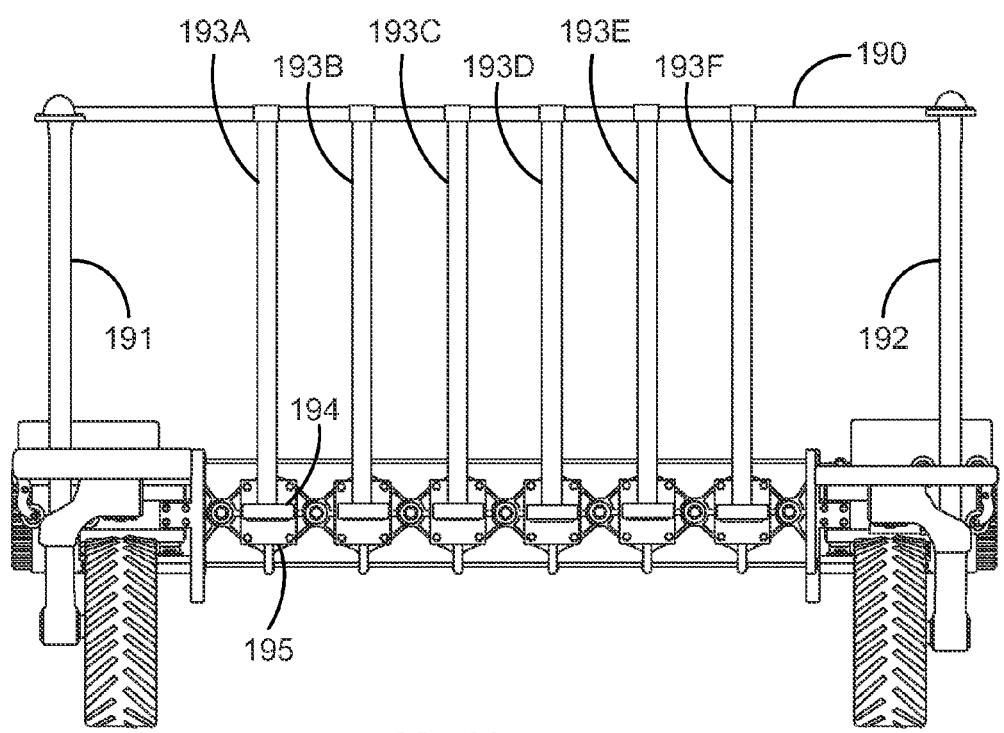
FIG. 19B is a front elevation of the same assembly shown in FIG. 19A with the wheels shown in a lowered position.

FIGS. 19A and 19B illustrate a modular toolbar attached to a pair of drive modules with a rod 190 extending between the two drive modules, along the top of the toolbar. The wheels of the two drive modules are journaled on the lower ends of a pair of vertical rods 191 and 192 attached at their upper ends to opposite ends of the transverse rod 190. The rods 191 and 192 pass through the wheel-support arms of the respective drive modules, which permits the rods 191 and 192 to be moved vertically through the drive modules, thus permitting the wheels to be moved vertically relative to the toolbar, which is attached to the frames of the two drive modules. FIG. 19A illustrates the wheels in their fully lowed position, and FIG. 19B illustrates the wheels in their fully raised position. In addition, a series of parallel rods 193A-193F are attached to at their upper ends to the transverse rod 190, so that the rods 193A-193F move vertically along with the rods 191 and 192. Each of the rods 193A-193F passed through a sleeve 194 attached to one of the toolbar modules, and the lower end of each rod carries a frame 195 that can be attached to one or more farm implements, so that the elevation of those implements will remain constant relative to the elevation of the wheels.

Figure 20A:
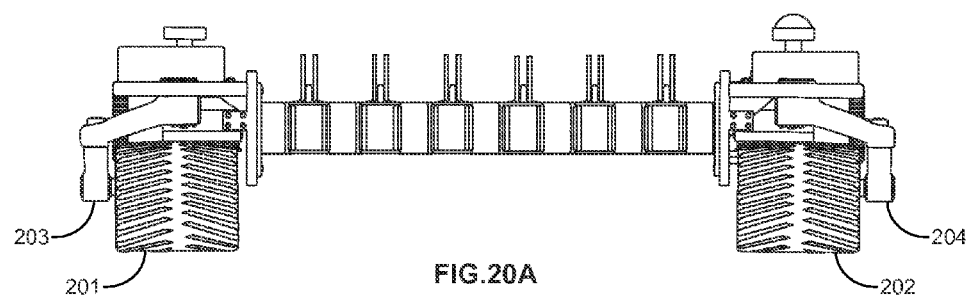
FIG. 20A is a front elevation of a modular autonomous agricultural vehicle having the wheels of the drive modules on axes parallel to the axis of the toolbar, with the wheels in an inboard position.
Figure 20B:
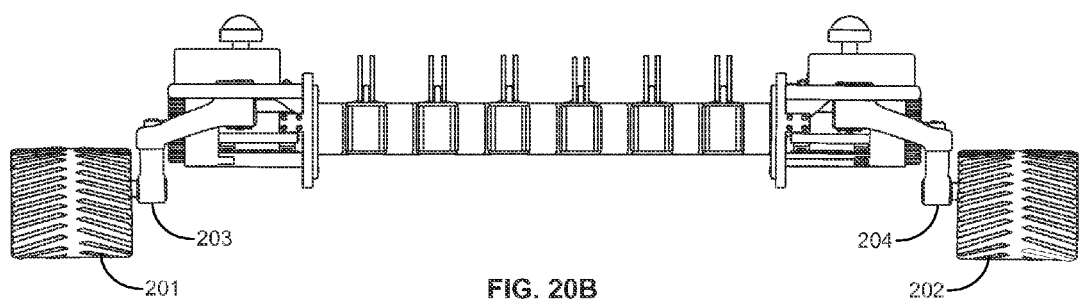
FIG. 20B is a front elevation of a modular autonomous agricultural vehicle having the wheels of the drive modules on axes parallel to the axis of the toolbar, with the wheels shown in an outboard position.

FIGS. 20A and 20B illustrate a modular toolbar attached to drive modules at both ends. Each drive module carries a single wheel 201 or 202 journaled on the lower end of respective support arms 203 and 204 having swiveling vertical sections that can be turned 180 degrees to move the respective wheels between stowed positions illustrated in FIG. 20A and an operating position illustrated in FIG. 20B.

Figure 21A:
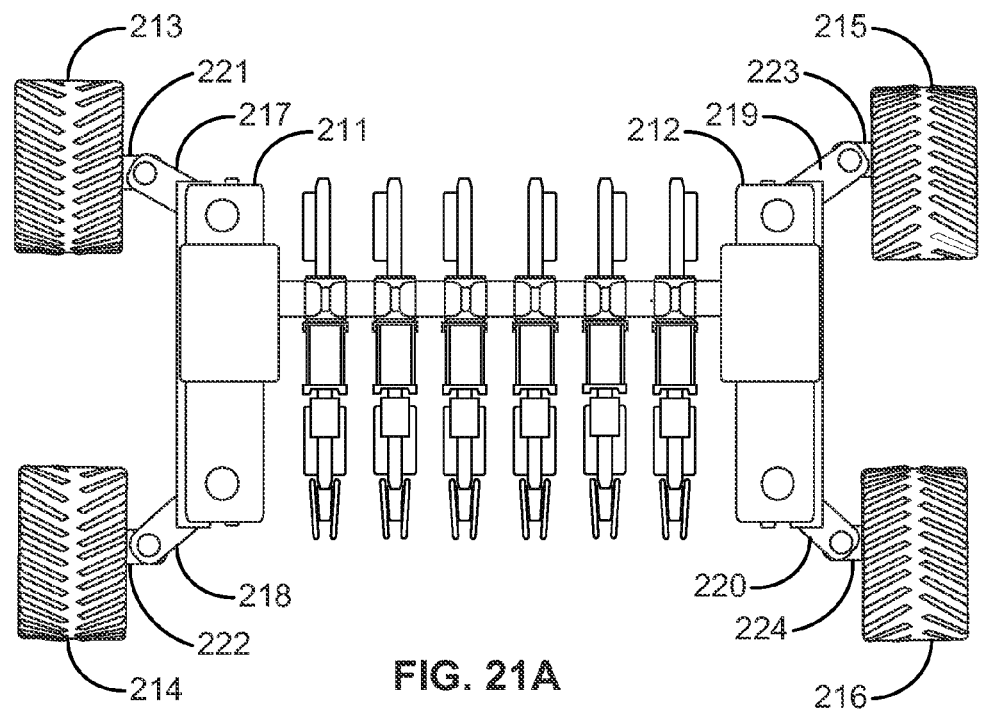
FIG. 21A is a top plan view of a modular autonomous agricultural vehicle having the wheels of the drive modules on articulated supports, with the wheels shown in a first position.
Figure 21B:
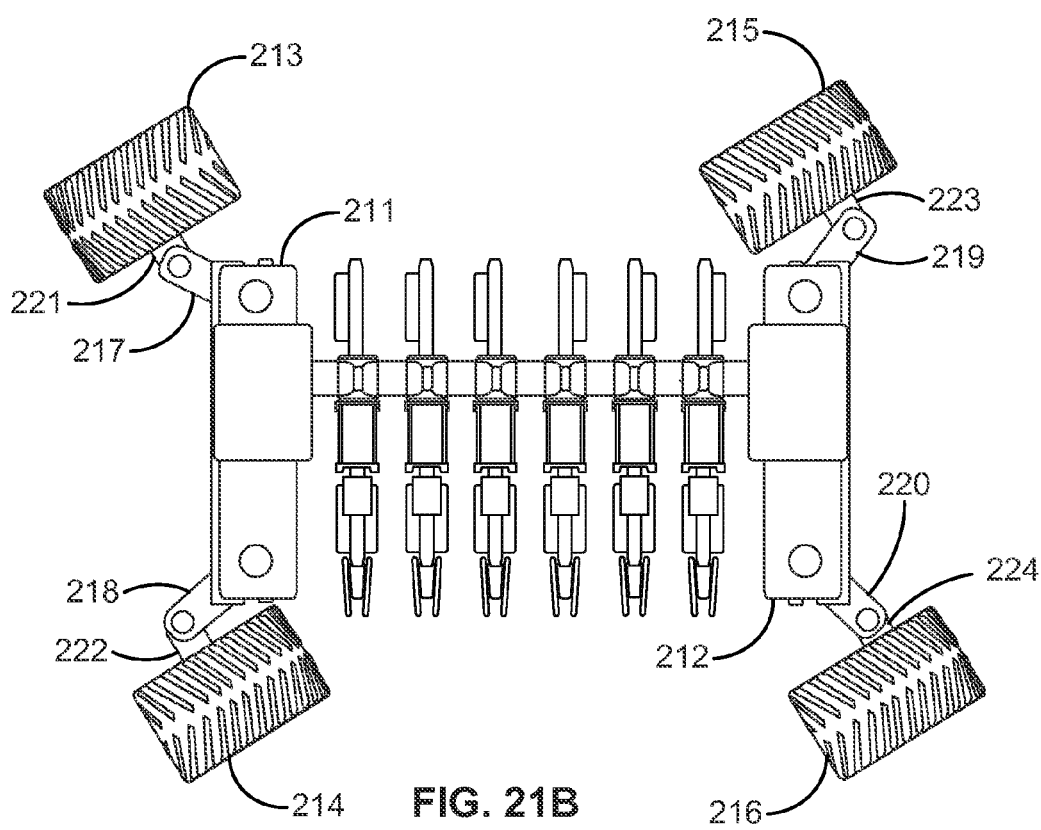
FIG. 21 B is a top plan view of a modular autonomous agricultural vehicle having the wheels of the drive modules on articulated supports, with the wheels shown in a second position.

FIGS. 21A and 21B illustrate a modular toolbar attached to drive modules at both ends. Each drive module carries a pair of wheel 213, 214 or 215, 216 journaled on the lower ends of respective support arms 217, 218, 219 and 220 via respective links 221, 222, 223 and 224. FIG. 21A shows the wheels in their operating, outboard positions, and FIG. 21B shows the wheels in their stowed, inboard positions. It can be seen that the addition of the links 221-224 permits the wheels to be retracted to a more compact configuration.

One or more currently preferred embodiments have been described by way of example. It will be apparent to persons skilled in the art that a number of variations and modifications can be made without departing from the scope of the invention as defined in the claims.

The invention claimed is:
1. A modular autonomous agricultural vehicle comprising
at least one drive module having a frame, a rotatable ground-engaging element coupled to said frame, a power source, and a drive motor receiving power from said power source and coupled to said ground-engaging element for rotating said element,
at least one toolbar module detachably coupled to said frame for coupling said drive module to an agricultural implement or another modular toolbar module, and
multiple toolbar modules coupled to each other in series to form a modular toolbar, said toolbar modules carrying ground engaging implements, and which includes a cable extending through all the toolbar modules of said modular toolbar to hold said modules together while allowing the toolbar to flex to follow the contour of the ground engaged by said implements.

2. The modular autonomous agricultural vehicle of claim 1 in which each of said toolbar modules has the same width as one of the rows in an agricultural field to be planted.

3. The modular autonomous agricultural vehicle of claim 1 in which said drive module includes at least two of said ground-engaging elements.

4. The modular autonomous agricultural vehicle of claim 3 is which said ground-engaging elements are selected from the group consisting of wheels and articulated tracks.

5. The modular autonomous agricultural vehicle of claim 3 in which said ground-engaging elements are mounted for movement between an operating position in which the ground-engaging elements are positioned for traversing an agricultural field, and a retracted position in which the ground-engaging elements are positioned to make the vehicle more compact for stowage or transporting.

6. The modular autonomous agricultural vehicle of claim 1 in which adjacent toolbar modules are coupled to each other to permit pivoting movement of said adjacent modules relative to each other.

7. The modular autonomous agricultural vehicle of claim 6 in which said coupling of adjacent toolbars limits the degree of pivoting movement of those modules relative to each other.

8. The modular autonomous agricultural vehicle of claim 1 in which said toolbar modules include hoppers for carrying commodities.

9. The modular autonomous agricultural vehicle of claim 1 in which said toolbar modules include support brackets adapted to be secured to hoppers for caring commodities.

10. The modular autonomous agricultural vehicle of claim 1 in which said ground-engaging element is pivotably coupled to said frame of said drive module.

11. The modular autonomous agricultural vehicle of claim 1 in which said drive module includes an attachment plate for coupling said drive module to said modular toolbar.

12. A modular autonomous agricultural vehicle comprising
at least one drive module having a frame, a rotatable ground-engaging element coupled to said frame, a power source, and a drive motor receiving power from said power source and coupled to said ground-engaging element for rotating said element, and
multiple toolbar modules coupled to each other in series to form an elongated modular toolbar having a selected length, at least one of said toolbar modules detachably coupled to said frame of said drive module with said elongated modular toolbar extending horizontally from said drive module for coupling said drive module to an agricultural implement or another modular toolbar module, wherein said ground-engaging element is mounted on said frame for movement around a vertical axis for controlling the direction of movement of both the drive module and the elongated modular toolbar, and a driveshaft extending through the length of said toolbar and coupled to said drive motor, and a driven module attached to said modular toolbar and coupled to said driveshaft.

* * * * *